United States Patent [19]
Haraikawa et al.

[11] 3,712,422
[45] Jan. 23, 1973

[54] DISK BRAKE ASSEMBLY

[75] Inventors: Tetsuo Haraikawa, Funabashi-shi, Chibaken; Sadao Kondo, Yokohama-shi, Kanagawa-ken; Hiromi Yazawa, Tokyo, all of Japan

[73] Assignee: Tokico Ltd., Kawasaki-shi, Kanagawa-ken, Japan

[22] Filed: Nov. 8, 1971

[21] Appl. No.: 196,485

[30] Foreign Application Priority Data

Nov. 7, 1970 Japan ................................45/98181

[52] U.S. Cl. ................188/72.3, 188/73.4, 188/72.5
[51] Int. Cl. ..............................................F16d 55/22
[58] Field of Search..........188/72.5, 73.4, 72.3, 73.3, 188/216

[56] References Cited

UNITED STATES PATENTS

| | | | |
|---|---|---|---|
| 3,396,824 | 8/1968 | Meier | 188/72.5 |
| 3,656,589 | 4/1972 | Kawabe | 188/72.5 |
| 3,536,166 | 10/1970 | Falk | 188/73.4 |

*Primary Examiner*—Allen N. Knowles
*Attorney*—Richard C. Sughrue et al.

[57] ABSTRACT

This invention concerns with a disk brake unit comprising a cylinder body fixedly mounted on the chassis or the like stationary members of the vehicle, a pair opposedly actuatable hydraulic pistons mounted in the bore of said cylinder body, a pair of friction pads movable towards and remote from a brake disk rotatable in unison with one of several wheels of said vehicle and a caliper slidably mounted on said cylinder body, one of said pads being adapted for actuation directly by the action of one of said pistons, while the remaining pad is adapted for actuation by the remaining piston through said slidable caliper.

The improvement resides in the separation of caliper supporting means from the sliding means relative thereto, so as to avoid any off-axial heavily wearing movement of the caliper actuating piston relative to said cylinder body.

2 Claims, 9 Drawing Figures

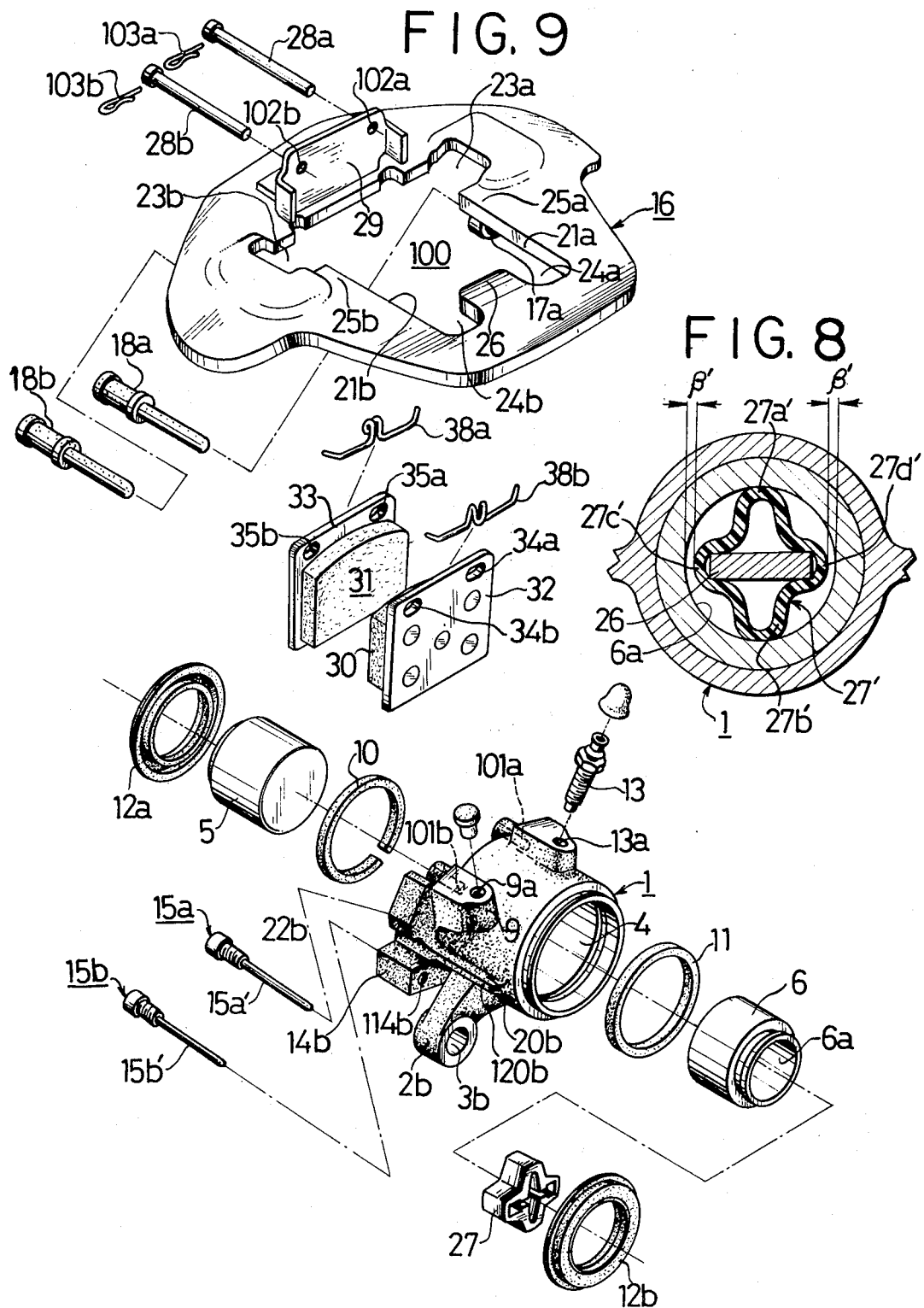

3,712,422

DISK BRAKE ASSEMBLY

This invention relates to improvements in and relating to a disk brake unit, especially adapted for use with a wheeled vehicle. More specifically, it relates to such a type of disk brake unit as comprising a pair of brake pads, a cylinder body fixedly mounted on a non-rotatable part of a vehicle and containing a pair of opposingly slidable pistons therein, a caliper mounted on said cylinder slidably in a parallel direction relative to the longitudinal axis of said cylinder, one of said pistons actuating directly one of said brake pads during braking operation, the remaining piston actuating at the same time the opposite brake pad through said caliper.

It is substantially common practice to provide relatively slide guide means between the cylinder body and the caliper, so as to serve, at the same time, as the support means for the caliper relative to the cylinder body. In addition, the effective length of the sliding part is substantially smaller than that of the effective axial distance of the cylinder.

A considerable drawback resides in liable wear of a yoke spring, normally provided between the both.

A further drawback resides in the unavoidable off-axial movement of the caliper-actuating piston relative to the cylinder bore, by virtue of the reversedly transmitted from the side of the yoke side brake pad to the related piston.

These and further objects, features and advantages of the invention will appear from the following detailed description of the invention when read by reference to the accompanying drawings illustrative substantially of a preferred embodiment of the invention.

In the drawings:

FIG. 8 is an exploded perspective view of the constituent parts of the disk brake unit according to the invention.

FIG. 9 is only a part of FIG. 5, yet illustrating a slightly modified embodiment.

Figure 5:
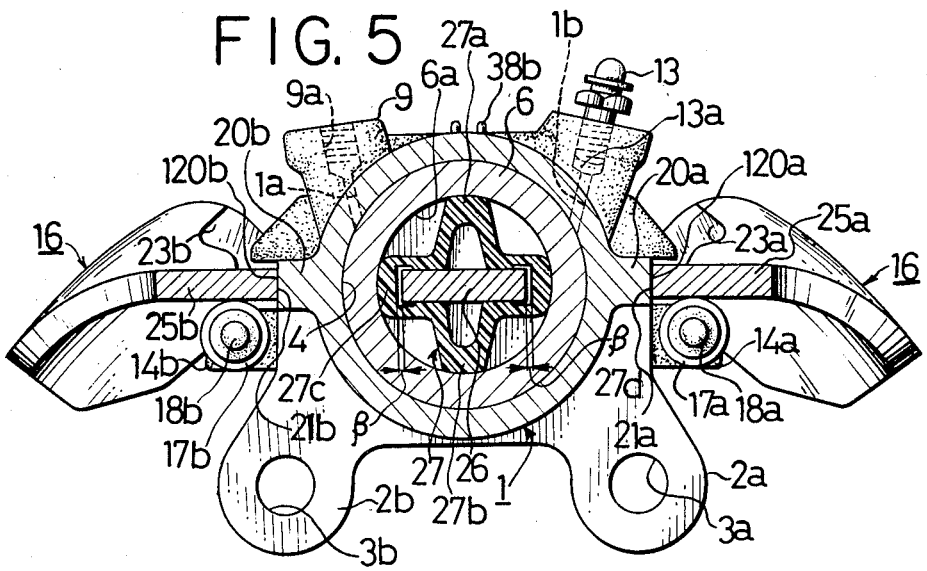
FIG. 5 is an enlarged cross-sectional view taken substantially along a section line V—V shown in FIG. 1.

Referring now to the accompanying drawings, numeral 1 denotes generally a hydraulic brake cylinder which has an axial bore 4 opened at its both ends, a pair of fixing projections 2a and 2b being formed at the lower side of said cylinder 1 and integral therewith, as most clearly be seen from FIG. 5. These projections 2a and 2b are provided with respective bolt holes 3a and 3b for attaching the cylinder 1 fixedly to a certain part of the chassis, not shown, of an automotive vehicle and in proximity to a related one of the travel wheels thereof.

Figure 6:
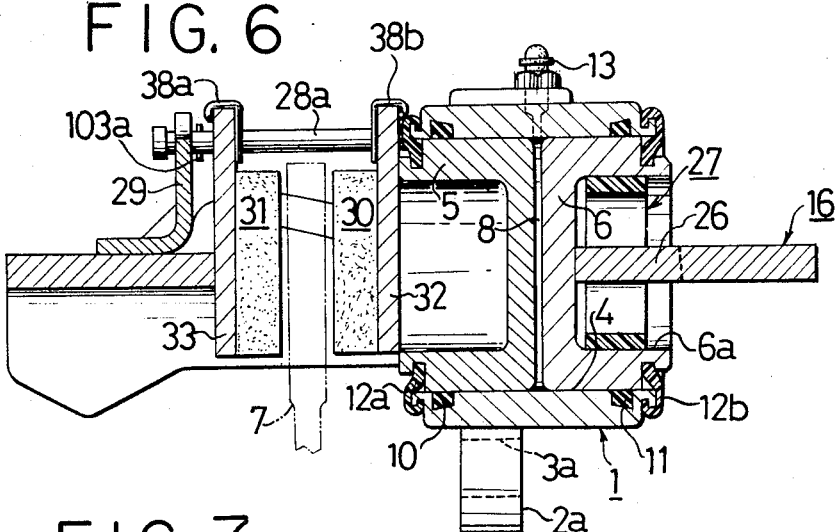
FIG. 6 is somewhat reduced and partial and axially sectioned view substantially taken along a section line VI—VI shown in FIG. 2.

A pair of opposed hydraulic brake pistons 5 and 6 are slidably received in the cylinder bore 4, as most clearly be seen from FIG. 6. The common axis of cylinder 1 and pistons 5;6 which is coincidence with the section line VI–VI' when seen in FIG. 2 is parallel to the rotating axis, not shown, of a brake dsik 7 only partially and schematically shown by chain dotted line, said disk being designed and arranged to rotate as conventionally in unison with the related vehicle wheel, not shown.

A conventional hydraulic pressure fluid supply source, preferably master cylinder, not shown, is connected through a brake piping, not shown, with a connecting socket 9 made integral with the cylinder 1 and having a passage bore 9a and an inclined lateral bore 1a (refer to FIG. 5) formed through the wall of cylinder 1, said lateral bore being kept in fluid communication with hydraulic chamber 8 formed in the cylinder 1 and between the opposing and working ends of both pistons 5 and 6.

There are provided two separate sealing rings 10 and 11 in the wall of hydraulic cylinder 1 for sealingly cooperating with respective hydraulic pistons 5 and 6.

Figure 1:
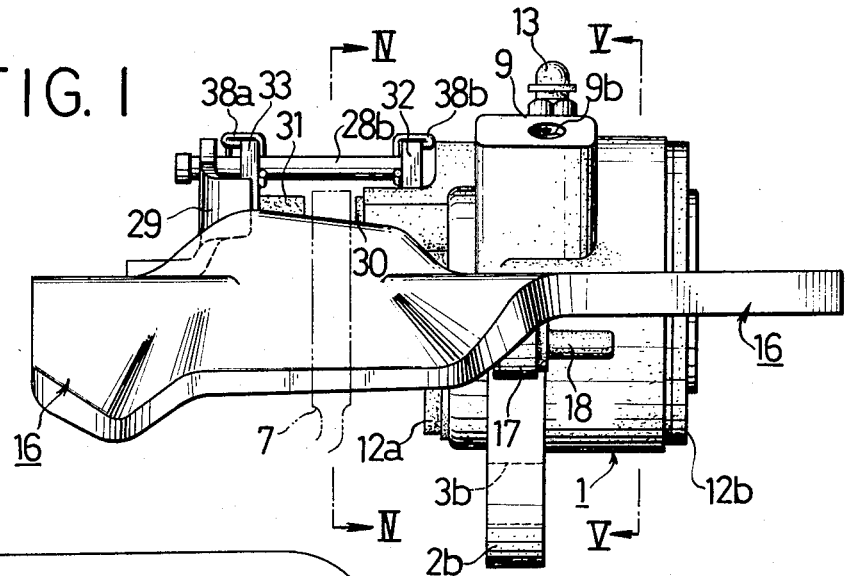
FIG. 1 is a side elevational view of the disk brake unit according to the invention.
Figure 2:
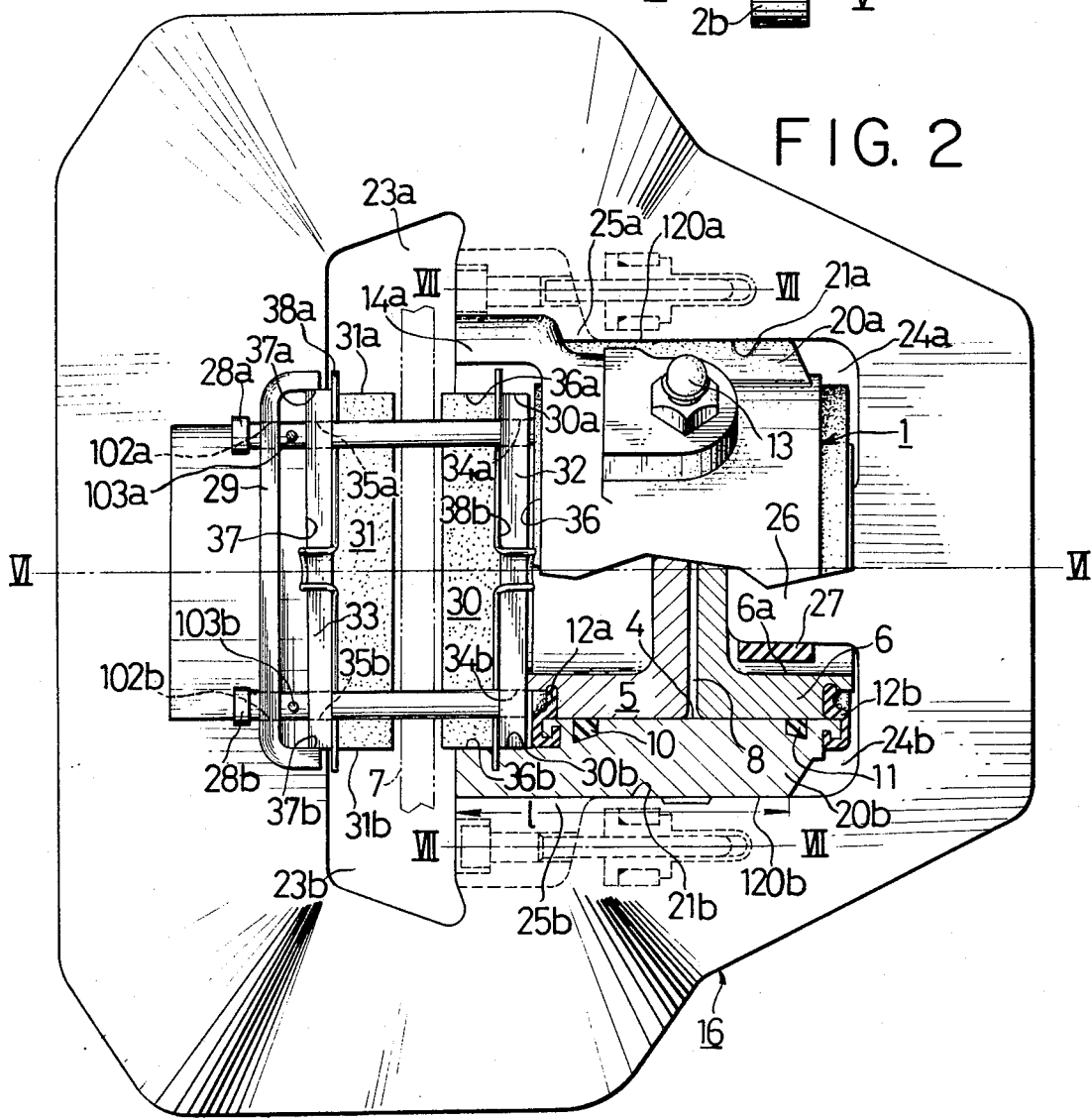
FIG. 2 is an enlarged plan view thereof, being, however, partly broken away and partially sectioned for better illustration.

It should be noted that each of the sealing rings 10 and 11 has an irregular cross-sectional configuration, so as to exert automatically an accumulated resilient action for forcibly returning the brake pistons to their respective off-service position shown in FIGS. 2 and 6, by the seal-roll-back action known per se, upon release of the hydraulic braking action to be described.

Respective dust covers 12a and 12b, made of a resilient material, such as rubber, soft plastic material or the like, bridgingly connect the respective outer ends of the brake pistons with the cylinder 1, for preventing otherwise invasion of foreign particles from the ambient atmosphere onto the sliding surfaces of the pistons 5;6 and the cylinder 1. Numeral 13 represents a conventional air bleeder valve which has a passage bore 13a kept in communication with the hydraulic working chamber 8 through an inclined lateral bore 1b formed through the cylindrical wall of the cylinder 1, in substantially similar way to that shown at 1a.

Figure 7:
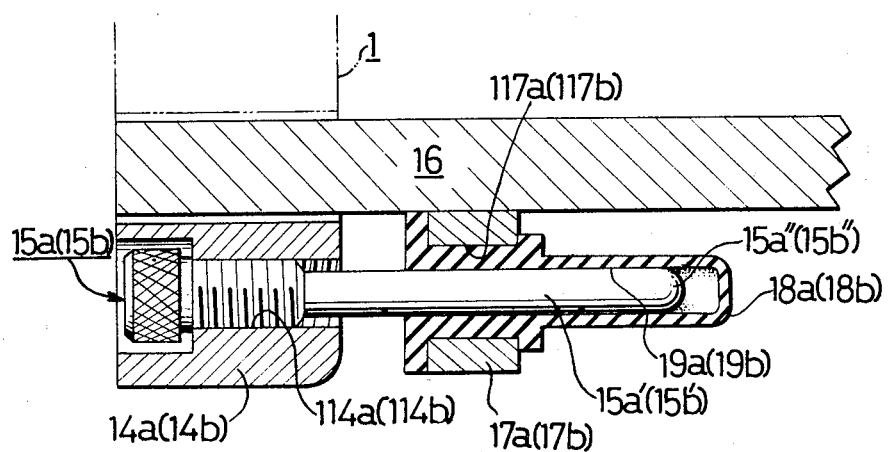
FIG. 7 is an enlarged sectional view taken substantially along a section line VII—VII shown in FIG. 2.

Shoulders 14a and 14b are formed integrally on the cylinder 1 and each with a tapped hole 114a or 114b, as most clearly seen from FIG. 7 as a representative thereof.

A headed and partially threaded spindle 15a or 15b, having a plain stem 15a' or 15b', respectively, is held in position in the tapped hole 114a or 114b, respectively, the axis of said spindle 15a or 15b being substantially parallel to the axis of said cylinder bore 4. The plain stem 15a' or 15b' extending axially from the hole 114a or 114b, respectively, and having respective rounded end 15a" or 15b", is received slidably in the axial blind bore 19a or 19b of gripper member 18a or 18b made of a resilient material such as rubber, soft plastic or the like, and is held in position within an axial bore 117a or 117b formed respectively through support member 17a or 17b which is fixedly attached to the lower side of a yoke or caliper 16, although the fixing means have been omitted for simplicity.

As most clearly seen from FIG. 5, a pair of coplanar lateral projections 20a and 20b are formed integrally on the cylinder 1, said projections extending axially of the cylinder bore 4 and having longitudinal edge surfaces 120a and 120b, respectively, which extend axially substantially over the whole length of the axis of cylinder bore 4 and are merged into the part of the cylinder 1 directly above the respective shoulders 14a and 14b, respectively.

As will be described more fully hereinafter, the edge surfaces 120a and 120b serve guide means kept in sliding contact with respective slide edges 21a and 21b formed on the caliper 16. A part of each of the guide edge surfaces 120a or 120b neighboring the shoulders 14a or 14b, respectively, is formed into a groove for performing easy sliding guide for the caliper. It will therefore be seen that overall axial length $l$ of each of the slide guide edges 21a and 21b is substantially equal to or even larger than the effective axial length of cylinder bore 4.

Figure 3:
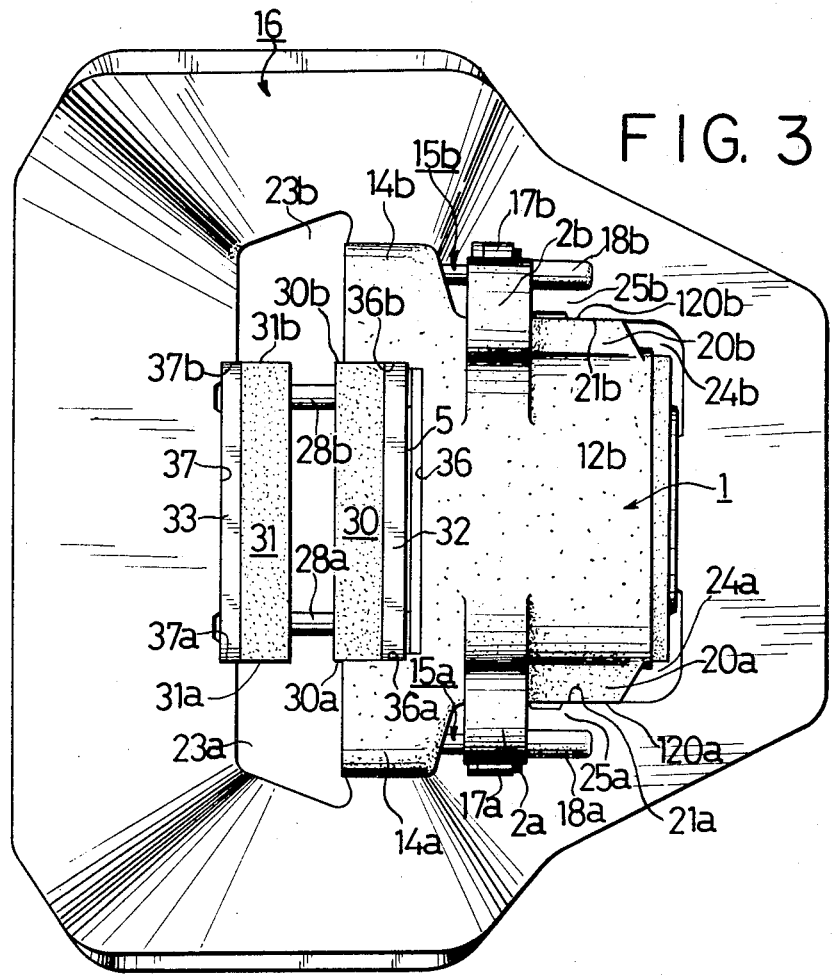
FIG. 3 is an inverted plan view of the brake unit shown in FIG. 2, yet being shown at a smaller scale.
Figure 4:
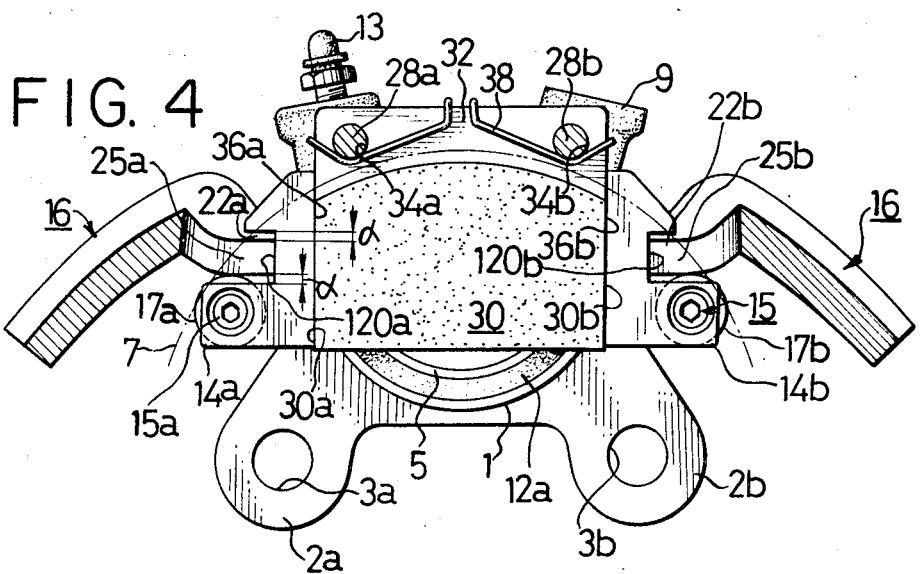
FIG. 4 is an enlarged sectional view taken substantially along a section line IV—IV shown in FIG. 1.

A pair of opposing lateral recesses 23a and 23b are formed on the caliper 16. Two separate parallel and axial recesses 24a and 24b are formed on the caliper 16, as most clearly be seen from FIG. 9. Caliper 16 is formed a large central opening 100 which is kept in communication with the lateral and axial recesses 23a;23b and 24a;24b. The brake disk 7 emerges partially from below to upper through said opening 100 and in registration with the lateral recesses 23a;23b, as may be easily supposed from FIGS. 2 and 4 in combination. On the other hand, the axial recesses 24 receive parts of the cylinder 1, as seen FIGS. 2, 3 and 5.

Longer straight and parallel edge parts 25a and 25b defining partially the central opening 100 are kept in engagement respectively with the grooves 22a and 22b forming the extensions of said slide guide edge surfaces 21a and 21b, respectively, and at portions directly above said shoulders 14a and 14b formed on the cylinder 1. Between the upper and lower sides of each of these grooves 22a;22b and the guide edges 25a;25b, there are provided idle gaps, each being denoted alpha appearing in FIG. 4. In this way, lateral movement of caliper 16 in the directions perpendicular to its general horizontal plane is limited by these idle gaps alpha.

There is provided a tongue 26 on the caliper 16 between the axial recesses 24a and 24b, said tongue extending along the axis of the cylinder bore 4 and partially into the interior space of the piston 6, as most clearly be seen from FIGS. 2 and 6. The tongue 26 is enclosed by a biassing ring 27, having a cross-sectional configuration of a hollow cross and made of an elastic material such as rubber, soft plastic or the like. Although the vertical wings 27a;27b of said cross are kept snugly in resilient contact with the inside wall surface 6a of the hollow piston 6, the horizontal wings 27c;27d are kept in cooperation with the side edges of said tongue 26 with small gaps beta, as shown in FIG. 5, the outer extremities of these horizontal wings being, however, kept equally as before in pressure engagement with the inside wall surface 6a of said hollow piston 6.

It will be seen, therefore, that lateral movement of the tongue 26 in the general plane of caliper 16 and relative to the piston-and-cylinder unit 1, 5 and 6 is limited by these lateral idle gaps "beta," while a relative vertical movement between said tongue and said piston 6 is substantially strictly forbidden.

There are provided with two pad assemblies being arranged at the both sides of the disk 7, and each comprising a friction pad 30 or 31 and a backing plate 32 or 33, fixedly attached with each other as commonly known per se. Backing plates 32 and 33 are formed respectively with supporting holes 34a;34b and 35a;35b for passingly receiving pad-positioning pins 28a and 28b, respectively. A bracket 29 extends laterally and is fixedly mounted on the caliper 16. For receiving the respective tip ends of these pad-supporting pins 28a and 28b, two reception openings 101a and 101b are formed on the cylinder 1, as hinted by dotted lines in FIG. 9.

These pins 28a;28b are passed through holes 102a;102b in the bracket 29, openings 35a;35b and 34a;34b formed through respective pad backing plates 32;33 and brought by their respective tip ends into engagement with said reception openings 101a;101b, for properly and slidably supporting the pad assemblies and bridging over the areas of said lateral recesses 23a and 23b. As seen, the axes of pins 28a;28b are positioned in parallel to the common axis of the piston-and-cylinder assembly.

Both sides surfaces 30a;30b of plate 32 are kept in slidable contaCt respectively with guide surfaces 36a;36b of a channel-shaped recess 36 formed on the cylinder 1 when seen in FIG. 2. Piston 5 is kept in contact with the rear surface of the backing plate 32. Pad 31, together with its backing plate 33 are brought by their both sides 31a;31b kept in contact with respective guide surfaces 37a;37b of a recess 37 formed in the edge connecting the axially outer edges of the lateral recess 23a;23b on the caliper 16.

Pad-retaining springs 38a;38b are provided for positioning resiliently the pad assemblies with the supporting pins 28a;28b, respectively.

Stop springs 103a;103b are provided and inserted into the pins 28a;28b for preventing draw-out of these pins from position, and by cooperation of bracket 29.

In FIG. 8, a slightly modified biassing ring is shown at 27'. This ring 27' is kept in substantially tight engagement with the tongue 26. In this modification, however, the horizontal wings 27c';27d' are physically separated from the inside wall surface 6a of hollow piston 6, by providing small idle gaps beta-dash therebetween. These gaps play similar function as those shown in the foregoing at beta.

The operation of the wheel brake cylinder assembly so far shown and described is as follows:

Now, it is assumed that the vehicle driver exerts his foot pressure upon a brake pedal, not shown, for initiating a braking operation. Then, the master cylinder is naturally energized and pressurized hydraulic liquid or oil will be conveyed from the master cylinder through brake piping to the socket 9, thence into the hydraulic working chamber, thereby the pistons 5 and 6 being energized to move in their mutually separating sense. Piston 5 urges therefore the first pad assembly including first pad 30 directly, so as to bring it into pressurized sliding contact with the rotating disk 7, when the vehicle is running. On the other hand, the second piston 6 will actuate the caliper 16, so as to urge the second pad 31 together with its backing plate 33 against the opposite surface of the disk 7. In this way, the disk 7 is subjected to braking action acting on its both surfaces. During this braking operation, the braking force acting upon friction pad 30 will be transmitted through the guide surfaces 36a;36b of recess 36 to the cylinder 1 and thus to the vehicle chassis, not shown.

On the other hand, the braking force acting upon friction pad 31 is transmitted through guide surfaces 37a;37b to the caliper 16, thence through guide edges 25a;25b in proximity to axial recesses 24a;24b, and through guide edge surfaces 21a;21b which serve as sliding guide means between caliper 16 and cylinder 1, again to the vehicle chassis.

As already described, since the length l of the guide edge surface 21a or 21b has been selected to be substantially equal to or ever larger than the effective length of the cylinder 1 and the idle gap between the surface 21a or 21b and that 25a or 25b may be only small for allowing the desired sliding movement, the caliper 16, although it is subjected to braking force during the braking operation, will provide no appreciable off-axial or pinch force upon the cylinder body 1. Further, since the tongue 26 of caliper 16 has side gaps "beta" as measured in the general plane of the caliper, it will tolerate such off-axial or pinch force even if it should take place between the caliper and cylinder body. It will thus be seen that even when the caliper and thus its tongue 26 should be subjected to a turning effort during a braking action, the braking force acting upon the friction pad 31 can be perfectly supported by the sliding portions between caliper 16 and cylinder body 1. In this way, piston 6 is not subjected to any influence of otherwise encountered off-axial braking force and thus only the caliper being actuated upon.

During brake actuation, spindles 15a;15b supporting the caliper 16, and grippers 18a;18b will act mutually in the following way: By the movement of caliper 16, grippers 18a;18b will be elastically deformed in its axial direction by pressurized gripping action relative to the spindles 15a'15b.

Upon release of the braking action, the accumulated elastic deformation of the grippers 18a; 18b will be released and it will be transmitted reversedly to the yoke 16 so as to return the latter to its initial position. Piston 5 in the cylinder 4 will be also returned automatically to its original position by virtue of the accumulated resilient force in the sealing means 10. In this way, friction pad 30 is separated from contact with disk 7.

Now, it is assumed that during travel of the vehicle, caliper 16 is moved up and down relative to its general plane and the cylinder body 1, movement will be suppressed to a possible minimum by the gaps denoted "alpha" in the foregoing. Therefore, the load imposed upon the spindles 15a;15b and the grippers 18a;18b may be limited to a reasonably acceptable limit.

In the following, several advantages of the invention will be enumerated briefly:

1. Since the relatively slidable length l between the cylinder body 1 and the caliper 16, an appreciable amount of off-axial movement otherwise invited between the both can be substantially avoided, thereby an ideal and effective braking action being realized with least possible frictional wear between the cylinder and the pistons. The overall assembly job of the apparatus can be made highly easier.

2. Braking force can be received at the relatively sliding portions between the cylinder body and the caliper, while the caliper-actuating piston is not affected upon by the braking force. An invitation of any appreciable off-axial movement of the piston can therefore be avoided.

3. Relative supporting part and the relative-sliding part are provided independently from each other. The caliper is supported resiliently through the intermediary grippers on the cylinder body. In this way, sliding wear can effectively be minimized.

4. Vertical movement of the caliper relative to the cylinder body can be minimized and suppressed with a possible minimum which depends on a certain specifically selected idle gaps denoted "alpha" in the foregoing and provided at the guide groove means adapted for receiving part of the caliper and formed in the shoulder means on the cylinder body. Brake reaction is received substantially completely at the relatively sliding parts between the cylinder body and the caliper. By virtue of this, the spindles and the grippers in the foregoing may be minimized.

The embodiments of the invention in which an exclusive property or privilege is claimed are as follows:

1. A disk brake unit comprising a pair of brake pads, a cylinder body fixedly mounted on a non-rotatable part of a vehicle and containing a pair of opposingly slidable pistons therein, a caliper mounted on said cylinder slidably in a parallel direction relative to the longitudinal axis of said cylinder, one of said pistons actuating directly one of said brake pads during braking operation, the remaining piston actuating at the same time the opposite brake pad through said caliper, said unit being characterized by that supporting part and sliding part of said caliper relative to said cylinder boy formed practically independent from each other, said supporting part having elastic means for resiliently supporting said caliper, said sliding part having a length substantially equal to or larger than that of the effective length of said cylinder body.

2. The brake unit as set forth in claim 1, wherein said caliper is formed with a tongue which is coupled through a resilient sleeve having a cross-sectional configuration of a hollow cross with one of said piston adapted for actuation of said caliper-operating piston.

* * * * *